United States Patent [19]

Smith et al.

[11] Patent Number: 5,081,367
[45] Date of Patent: Jan. 14, 1992

[54] ELECTRIC POWER SYSTEM WITH MAINTENANCE BYPASS FOR UNINTERRUPTIBLE POWER SUPPLY USING CLOSED TRANSITION OPERATION

[75] Inventors: George A. Smith, N. Huntingdon; Thomas K. Fogle, Shaler, both of Pa.; James R. Hanna, London; Larry S. Lakes, Tyner, both of Ky.

[73] Assignee: Westinghouse Electric Corp., Pittsburgh, Pa.

[21] Appl. No.: 549,521

[22] Filed: Jul. 6, 1990

[51] Int. Cl.$^5$ .............................................. H02J 9/06
[52] U.S. Cl. .......................................... 307/64; 307/85
[58] Field of Search ................. 200/50 C, 501; 74/48, 74/55; 307/64–65, 85–87, 70; 315/86; 340/333

[56] References Cited

U.S. PATENT DOCUMENTS

| | | | |
|---|---|---|---|
| 3,132,255 | 5/1964 | Spinnelli et al. | 307/64 |
| 3,778,633 | 12/1973 | DeVisser et al. | 307/64 |
| 4,021,678 | 5/1977 | Moakler et al. | 307/64 |
| 4,398,097 | 8/1983 | Schell et al. | 307/64 |
| 4,423,336 | 12/1983 | Iverson et al. | 307/64 |

OTHER PUBLICATIONS

Instructions for Transfer Switches Breaker Type Construction, Mar. 23, 1983, IL 14477-D File 20-900, Westinghouse Electric Corporation, D&P BU Components Division, London, Ky. 40741.

Primary Examiner—A. D. Pellinen
Assistant Examiner—Richard T. Elms
Attorney, Agent, or Firm—M. J. Moran

[57] ABSTRACT

An uninterruptible power source having a static transfer switch which switches rapidly between a commercial power source and an alternate power source is removed from service by a maintenance bypass switch having a first switch in series with the uninterruptible power source and a second switch which shunts the uninterruptible power source and the first switch. The first and second switches are circuit breakers having handles which toggle between open and closed positions. The maintenance bypass switch includes an operator which operates the two circuit breakers in opposition with a closed transition so that one switch is always closed. An interlock prevents operation of the maintenance bypass switch when the alternate power source of the uninterruptible power supply is selected by the static transfer switch. An isolation switch between the uninterruptible power source and the commercial power source and also shunted by the second switch of the maintenance bypass switch is open together with the first switch of the maintenance bypass switch when the uninterruptible power source is to be isolated for maintenance.

5 Claims, 7 Drawing Sheets

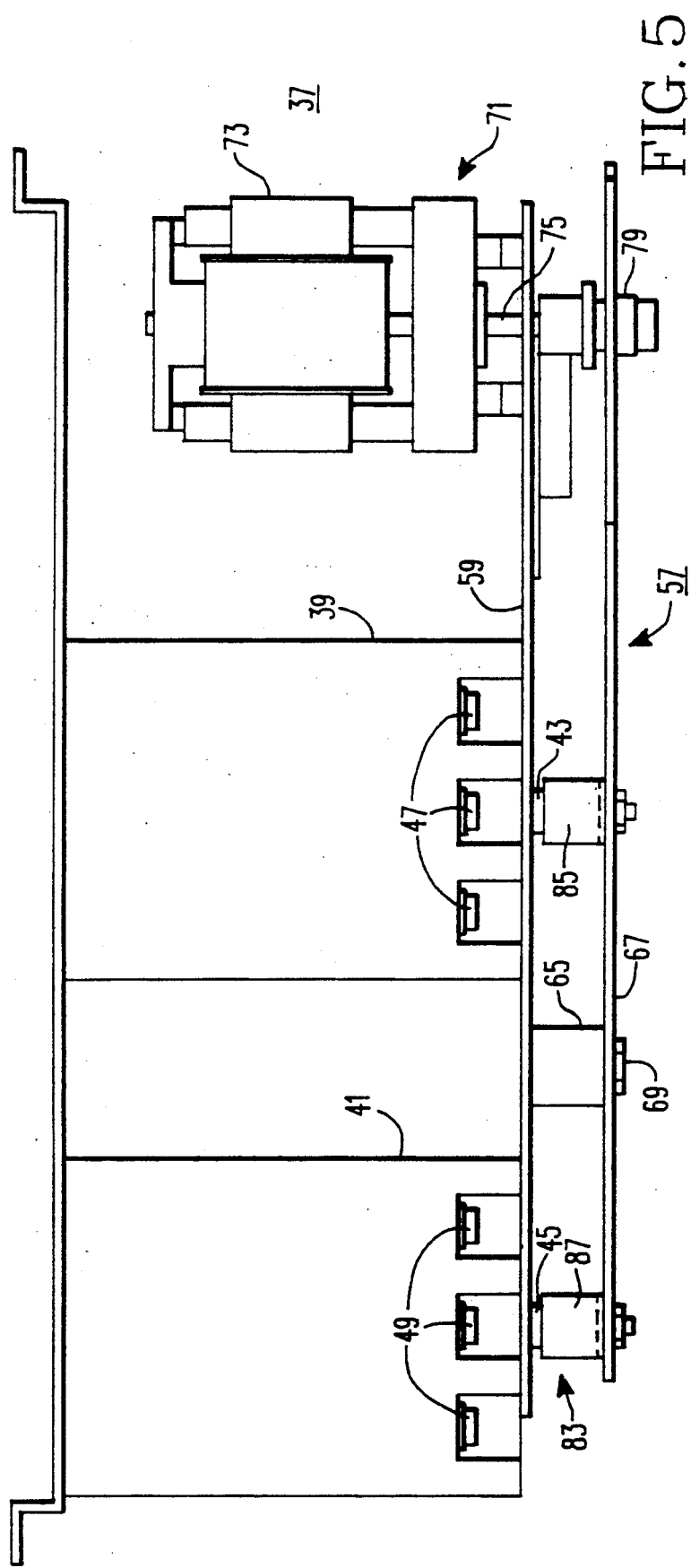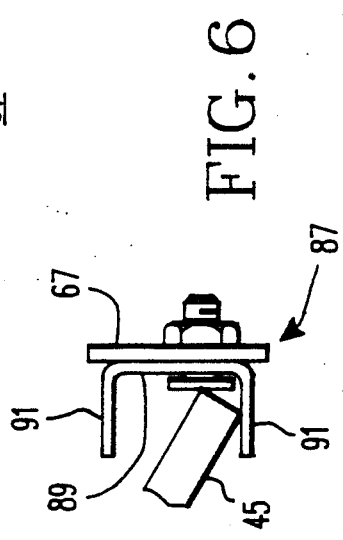

ELECTRIC POWER SYSTEM WITH MAINTENANCE BYPASS FOR UNINTERRUPTIBLE POWER SUPPLY USING CLOSED TRANSITION OPERATION

BACKGROUND OF THE INVENTION

1. Field of the Invention

This invention relates to systems in which an alternate power source provides uninterrupted power to a load when commercial power fails or becomes unreliable and more particularly the invention relates to such a system providing uninterrupted power to the load from the commercial source when the alternate power source is taken out of service such as for maintenance.

2. Background of the Invention

In many installations it is common to have an alternate ac power source in the event that commercial power is lost or becomes unreliable. Such an alternate power source often comprises for instance an ac generator driven by an internal combustion engine. For switching between sources, a transfer switch disconnects one power source and connects the other. Such a transfer switch typically provides an open, or break-before-make, transition between the two power sources. That is, the transfer switch disconnects the source initially supplying power to the load before connecting the second source. This avoids the surges that would occur if two unsynchronized sources were connected to the load simultaneously.

Usually the transfer switches are specially designed devices which provide open transition switching. In some instances, transfer switches have been designed utilizing a pair of circuit breakers and a mechanism for operating the two circuit breakers in opposition. U.S. Pat. No. 3,778,633 discloses such a device in which the two circuit breakers mounted end to end are operated in opposition by a ganging member driven rectilinearly by a screw shaft engaging a traveling nut connected to the ganging member. In another switching device of this type, the handles of two side-by-side circuit breakers are operated by clevices attached to a lever arm which is rotated about a pivot axis between the two circuit breakers. In another transfer switching device using two side by side circuit breakers, slides engaging the circuit breaker handles are driven in opposition by gears having an eccentric pin which engages a camming surface on the slide.

All of the aforementioned transfer switches provide open transition operation and thus, momentarily interrupt power to the load. Such an interruption of power is unacceptable in certain applications. For instance, digital computers with volatile memories lose all the stored information if power is disconnected for longer than a very short interval. Uninterruptible power supplies have been developed for such applications. One such uninterruptible power supply includes a battery which is normally charged by a battery charger connected to the commercial power system. When commercial power is lost, an inverter fed by the battery provides ac power to the load. A special static switch provides a rapid open transfer between the commercial power source and the inverter. The resultant interruption of power only lasts for a few milliseconds which is not of long enough duration to adversely affect loads such as computer memories.

At times it becomes necessary to remove the uninterruptible power supply from the system for maintenance.

It is a primary object of the invention to provide an electric power system in which an uninterruptible power source can be removed from the system for maintenance automatically without damaging interruption of power to a load.

It is a more specific object of the invention to provide such a system in which an automatic closed, that is a make-before-break transition is effected when removing the uninterrupted power supply and switching to commercial power.

It is still another object of the invention to provide such a system in which means are provided to prevent such automatic closed transition when the alternate power source of the uninterruptible power supply is providing power to the load.

It is a subordinate object of the invention to effect the closed transition to commercial power from an uninterruptible power supply using maintenance bypass switches incorporating circuit breakers or molded case switches.

SUMMARY OF THE INVENTION

These and other objects are realized by an electric power system which includes an uninterruptible power supply having a transfer switch which can selectively connect either a primary power source or an alternate power source to the load, and a maintenance bypass switch which includes a first switch connected in series between the uninterruptible power supply and the load and a second switch bypassing the uninterruptible power supply and the first switch and connecting the primary power source directly to the load. The maintenance bypass switch also includes operating means which operates the first and second switches simultaneously in opposition to selectively open one of the switches and close the other with both of the switches closed momentarily to provide closed transition operation. The system preferably further includes an isolation switch connected in series between the input of the uninterruptible power supply and the primary source and shunted together with the uninterruptible power supply and the first switch by the second switch. This isolation switch is opened together with the first switch of the maintenance bypass switch to isolate the uninterruptible power supply for maintenance.

The uninterruptible power supply preferably includes lockout means which is actuated when the transfer switch is positioned to connect the alternate power source to the load. The maintenance bypass switch operating means responds to actuation of the lockout means to prevent operation of the switches of the maintenance bypass switch thereby precluding a closed transition transfer between the alternate power source of the interruptible power supply and the primary power source.

The two switches of the maintenance bypass switch may be implemented by circuit breakers having handles which toggle between off and on positions. As used throughout, the term circuit breaker is intended to include, as well as devices normally referred to as circuit breakers, molded case switches which toggle between off and on positions and which may or may not have short circuit protection. An operating mechanism of the maintenance bypass switch operates the circuit breakers in opposition and assures that the one circuit breaker is toggled on before the other circuit breaker is toggled off to provide the desired closed transition operation. In one embodiment of the invention, the operating mechanism includes a lever arm pivoted between the two side-by-side circuit breakers, and coupling members in the form of clevices which engage the respective circuit breaker handles. The legs of the clevices are spaced such as to provide the closed transition operation. In a second embodiment of the operating mechanism, eccentric pins on gears engage camming surfaces on slides which engage the respective switch handles. These gears are engaged by a common drive gear driven by the motor to operate the circuit breakers in opposition. The camming surfaces on the two slides are configured to provide the closed transition operation.

BRIEF DESCRIPTION OF THE DRAWINGS

A full understanding of the invention can be gained from the following description of the preferred embodiments when read in conjunction with the accompanying drawings in which:

FIG. 5 is a top plan view of the maintenance bypass switch of FIG. 4.

FIG. 6 is a fragmentary side view taken along the line VI—VI in FIG. 5 of a coupling member which forms part of the maintenance bypass switch of FIGS. 4 and 5.

DESCRIPTION OF THE PREFERRED EMBODIMENTS

Figure 1:
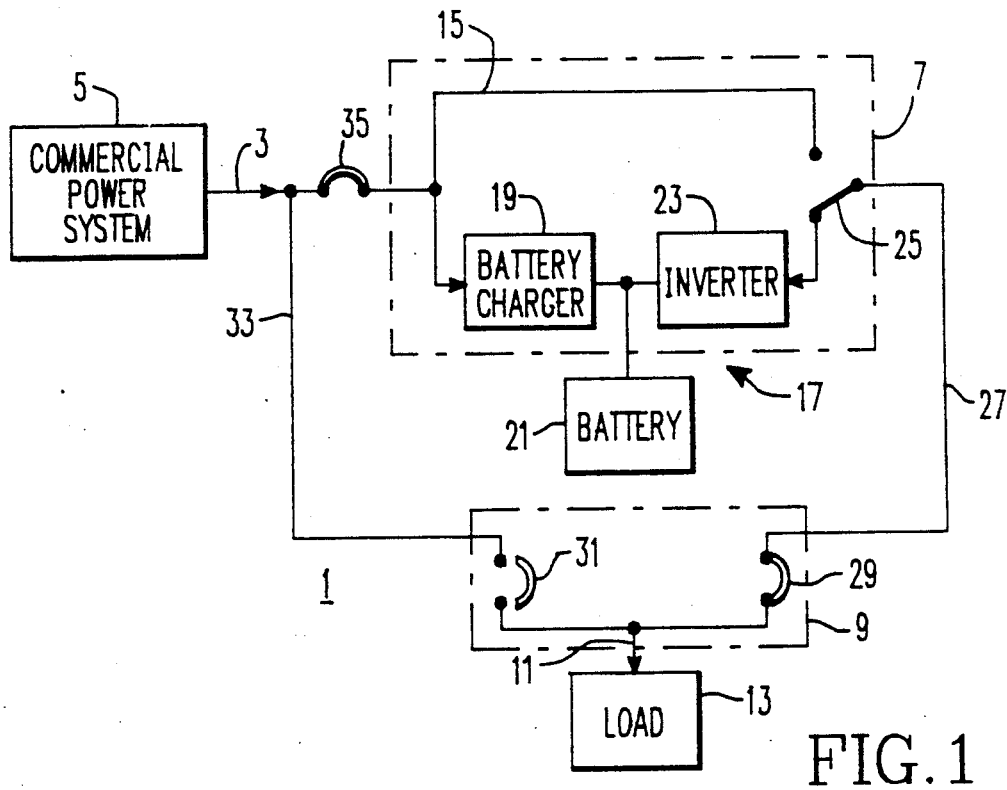
FIG. 1 is a schematic diagram of an electric power system in accordance with the invention configured for normal operation.
Figure 2:
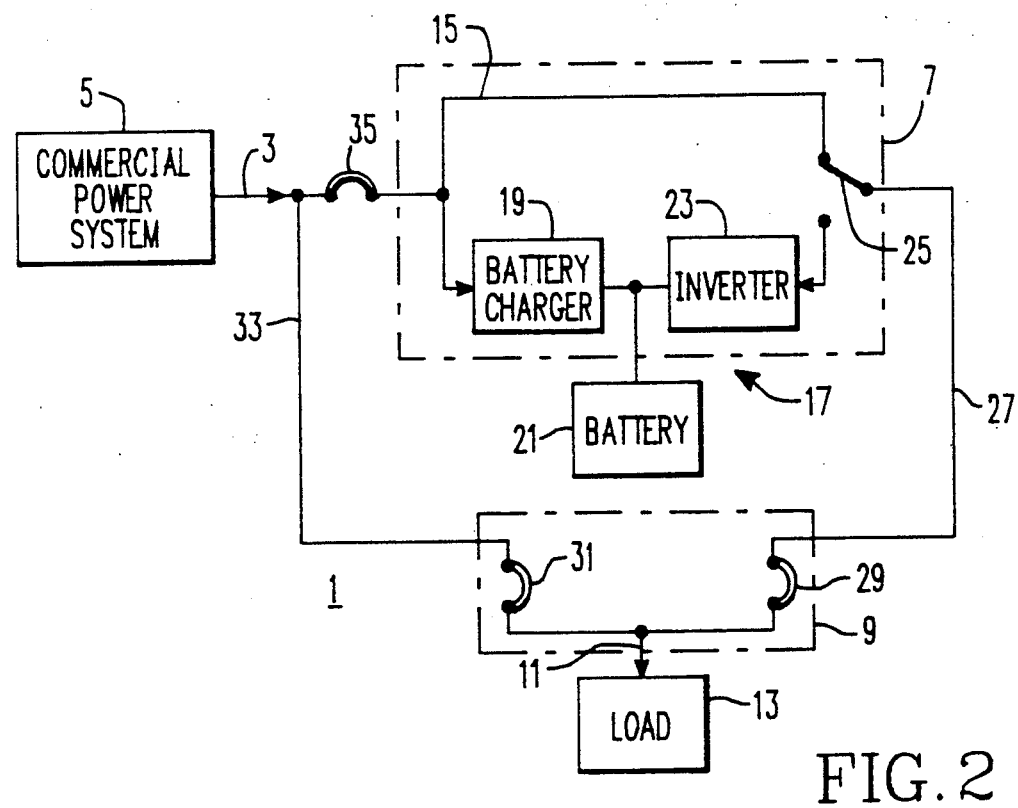
FIG. 2 is a schematic diagram of the electric power system of FIG. 1 configured for a closed transition.
Figure 3:
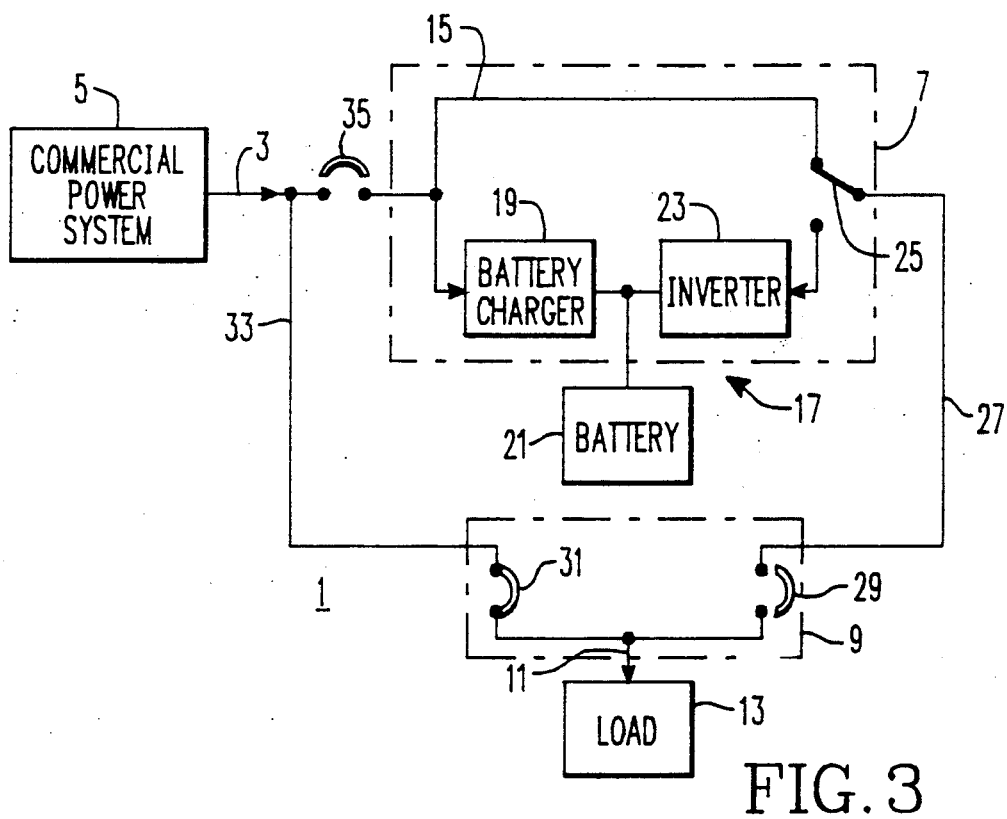
FIG. 3 is a schematic diagram illustrating the electric power system of FIG. 1 configured for maintenance bypass in accordance with the invention.

Referring to the drawings, an electric power system 1 in accordance with the invention is illustrated in FIGS. 1-3. While a single line representation is used for clarity of presentation, it will be evident to those skilled in the art that the system could be either single phase of multiphase. In fact, specific embodiments of threephase maintenance bypass switches which form part of the electric power system 1 will be described below.

The electric power system 1 includes lines 3 which receive power from a commercial power system 5, and uninterruptible power source 7, a maintenance bypass switch 9, and lines 11 which deliver power to a load 13. The uninterruptible power source 7 includes a commercial power conductor 15 in parallel with an alternate power source 17 which includes a battery charger 19 charging a set of batteries 21 from the commercial power system 5, and an inverter 23. The uninterruptible power supply 7 also includes a static transfer switch 25 which connects either the commercial power conductor 15 or the alternate power source 17 to a conductor 27.

The maintenance bypass switch 9 includes a normal switch 29 and a bypass switch 31. The normal switch 29 connects the conductor 27 from the uninterruptible power source 7 to the line 11 connected to the load 13. The bypass switch 31 is connected in parallel with the uninterruptible power supply 7 and the normal switch 29 between the line 11 connected to the load 13 and the line 3 connected to the commercial power system by a conductor 33. An isolation switch 35 connected in series with the uninterruptible power source 7 and normal switch 29 is also shunted by the bypass switch 31 and conductor 33.

Under normal conditions, the isolation switch 35 and the normal switch 29 in the maintenance bypass switch 9 are closed to connect the uninterruptible power source 7 between the commercial power system 5 and the load 13. Under the usual conditions, the static transfer switch 25 is set to connect the commercial power conductor 15 to the conductor 27 so that the load is supplied with power from the commercial power source 5. Under these conditions, the batteries 21 are charged by the battery charger 19 from the commercial power source 5. Should the commercial power source 5 fail, the static transfer switch 25 operates to disconnect the commercial power conductor 15 from the conductor 27 and connect in its place the inverter 23 of the alternate power source 17. This is an open transition, that is a break-before-make transfer in which the static transfer switch 25 disconnects the commercial power source from the conductor 27 before connecting the alternate power source 17. However, this transition occurs in a few milliseconds which is not of sufficient duration to have an adverse affect on most loads, even digital computers with volatile memories.

At times, it becomes necessary to take the uninterruptible power source 7 out of service such as for maintenance. This operation is illustrated in FIGS. 2 and 3. In order to bypass the uninterruptible power source 7, the static transfer switch 25 must be in the position shown in FIG. 2 in which the commercial power source 5 is connected to the load 13. A closed transition is then effected by closing the bypass switch 31 of the maintenance switch 9 while the normal switch 29 remains closed. Since the parallel circuits created by closing both the bypass switch and the normal switch with the transfer switch connected to the commercial power conductor 15 are both carrying power from the commercial power source 5, there is no phase mismatch in the power in the two parallel circuits. The transition is completed by opening the normal switch 29 and the isolation switch 35 as shown in FIG. 3 to completely remove the uninterruptible power source 7 from the remainder of the electrical system 1.

Figure 4:
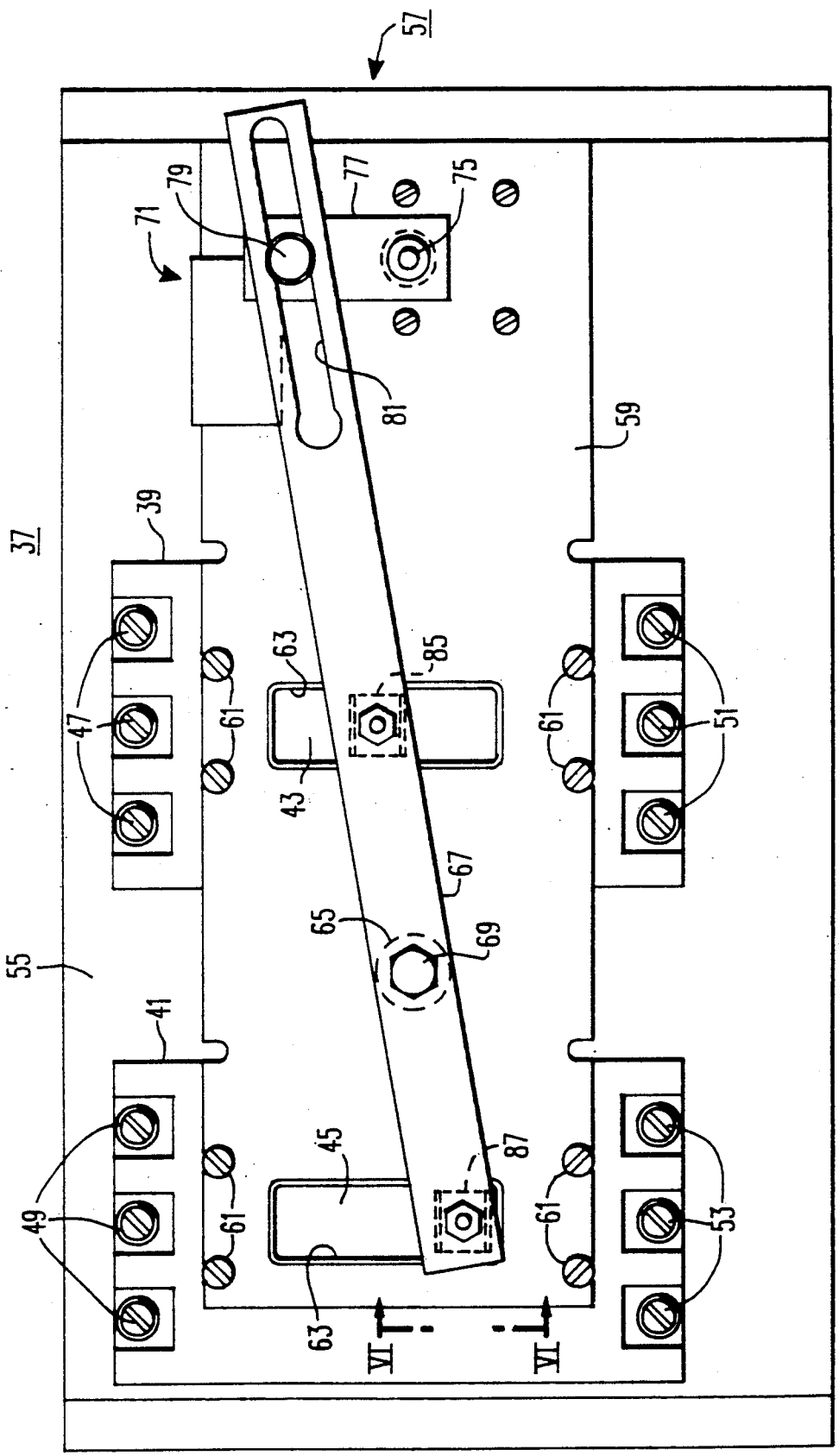
FIG. 4 is a front elevation view of one embodiment of a maintenance bypass switch which forms part of the electric power system of FIG. 1.

One form of a suitable maintenance bypass switch 9 is shown in FIGS. 4-6. This maintenance bypass switch 37 includes a pair of circuit breakers 39 and 41 for the normal and bypass switches 29 and 31, respectively. These circuit breakers 39 and 41 may be any one of various known types. For example, the circuit breakers illustrated in U.S. Pat. No. 4,650,944 can be utilized. These circuit breakers 39 and 41 have operating handles 43 and 45, respectively, projecting from the front face of the breakers. These handles 43 and 45 can be toggled over a large radius arcuate path between an on position and an off position and may be advanced beyond the off position to a reset position. The circuit breakers 39 and 41 are normally threephase devices having line terminals 47 and 49 connected to the appropriate phases of conductors 27 and 33, respectively, and load terminals 51 and 53 both connected to the appropriate phases of the conductor 11.

The circuit breakers 39 and 41 are mounted side by side in spaced relation on a mounting panel 55.

The maintenance bypass switch 37 includes an operating mechanism 57. This operating mechanism includes a base plate 59 secured to the circuit breakers 39 and 41 by screws 61. The base plate 59 has cutouts 63 through which the handles 43 and 45 project. A cylindrical pivot support 65 is secured to the base plate 59 at a point midway between the cutouts 63. A lever arm 67 is pivotally mounted on the cylindrical pivot support by a bolt 69. The lever arm is rotated about the pivot axis formed by the bolt 69 by motive means 71 which includes an electric motor 73 bolted to one end of the base plate 59, which is cantilevered out beyond the circuit breaker 39, and has a shaft 75 which extends through the base plate 59. A crank arm 77 secured at one end to the shaft 75 has a coupling pin 79 at the free end which is engaged by a longitudinal slot 81 in the lever arm 67.

Coupling members 83 in the form of clevices 85 and 87 bolted to the lever arm 67 couple the lever arm 67 to the circuit breaker handles 43 and 45 respectively. As shown in FIG. 6, the clevices such as 87 have a web 89 which separates the legs 91 by a distance greater than the thickness of the circuit breaker handles such as 45.

Operation of the motor 73 causes the lever arm 67 to rock about the pivot axis formed by the bolt 69. As the lever arm rotates clockwise, the clevice 85 engages the handle 43 to turn circuit breaker 39 off, while the clevice 87 engages the handle 45 to turn the circuit breaker 41 on. Conversely, when the lever arm 67 is rotated counterclockwise, the circuit breaker 39 is turned on and the circuit breaker 41 is turned off. The vertical location of the pivot axis and the spacing between the legs 91 on the clevices 85 and 87 is such that the handle of the circuit breaker that is being turned on reaches the toggle position where it snaps to the on position before the other handle is rotated to the position where it toggles to the off position so that both circuit breakers are momentarily on to provide the closed transition.

Figure 7:
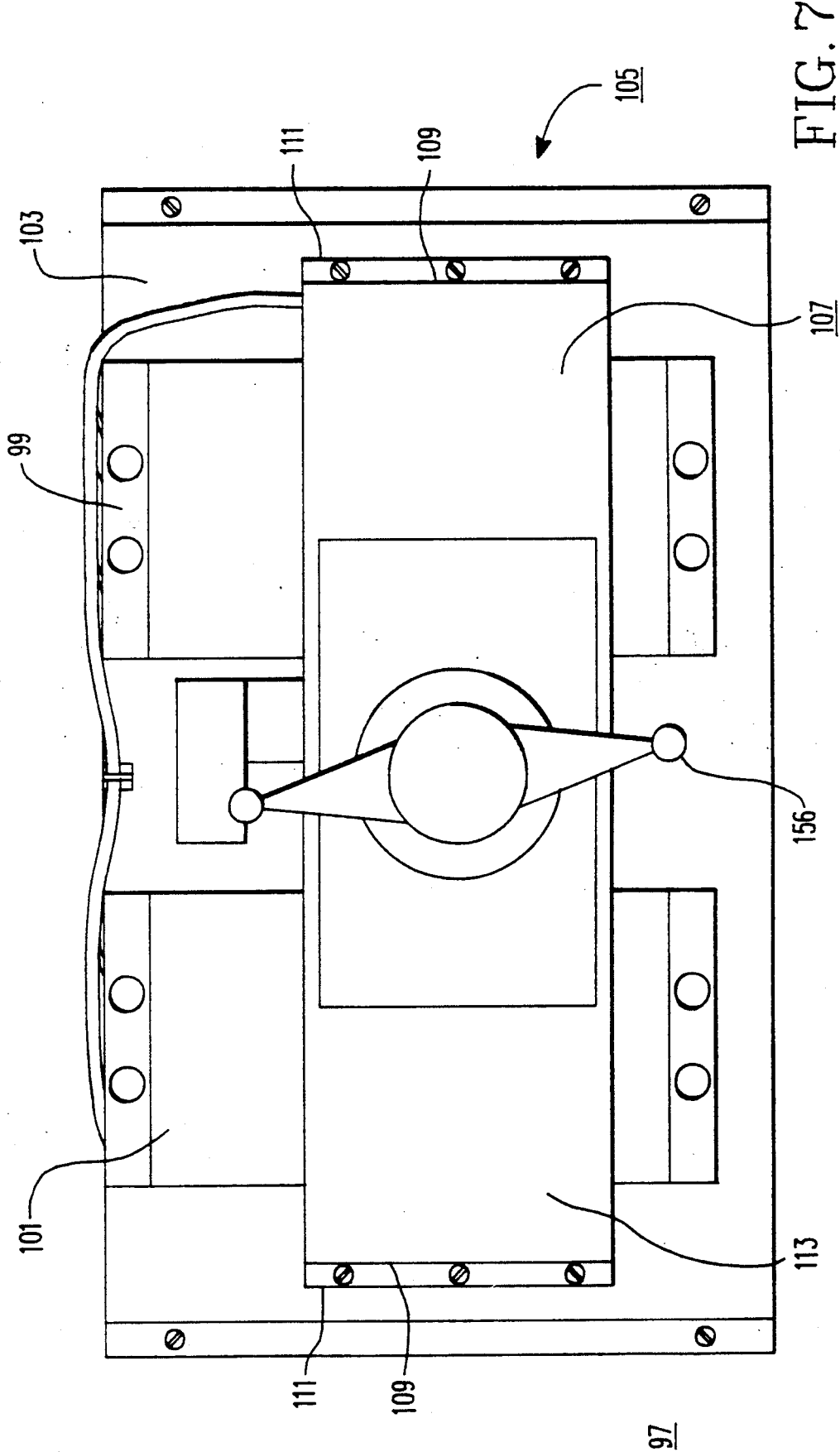
FIG. 7 is an isometric view of a second embodiment of a maintenance bypass switch which forms part of the electric power system of FIG. 1.
Figure 8:
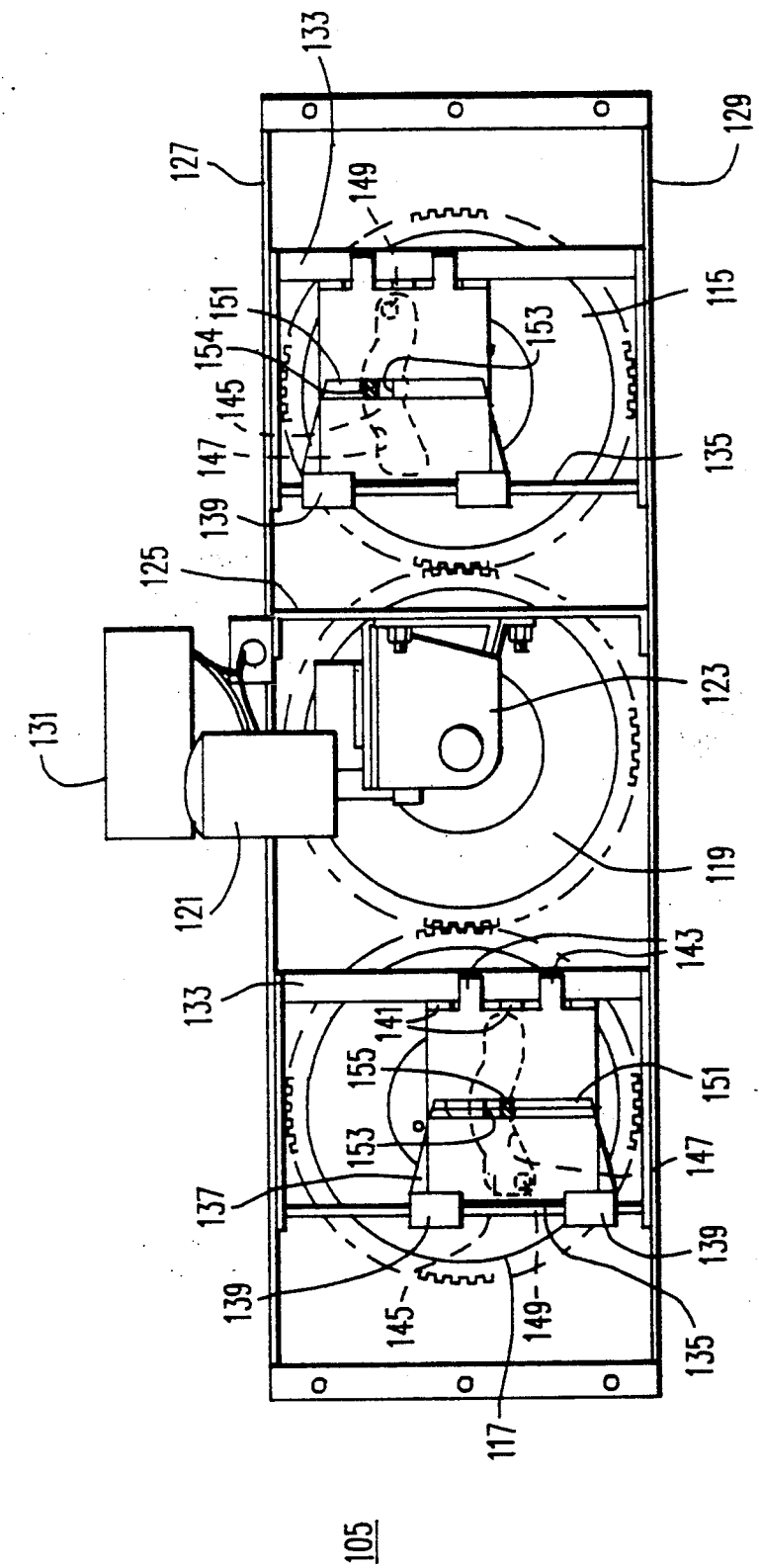
FIG. 8 is a bottom plan view of the operating mechanism of the maintenance bypass switch of FIG. 6.

A second embodiment of a maintenance bypass switch 97 suitable for use with larger, higher rated circuit breakers is shown in FIGS. 7 and 8. This maintenance bypass switch 97 also includes two circuit breakers 99 and 101 mounted side by side on a mounting panel 103. An operating mechanism 105 for the maintenance bypass switch 97 includes a mounting bracket 107 having legs 109 bolted to the mounting panel 103, and a front panel 113 spaced from the front of the circuit breakers 99 and 101.

As viewed in the back elevation view of FIG. 8, operating mechanism 105 includes a pair of spur gears 115 and 117 rotatably mounted on the inside of the front panel 113. The pivot axis of the spur gears 115 and 117 are laterally aligned with the vertical center line of the circuit breakers 99 and 101, respectively. A third spur gear 119 meshes with the gears 115 and 117 and is driven by an electric motor 121 through a gear reducer 123 which is bolted to a support bracket 125 secured to top and bottom flanges 127 and 129 on the front panel 117. A brake 131 is mounted on the electric motor 121. Adjacent each spur gear 115 and 117, and extending between the top and bottom flanges 127 and 129, are guide bar 133 and a spaced apart guide rod 135. Between each set of guide bars 133 and guide rods 135 is a molded nylon slide 137 adjacent one lateral edge. Each slide 137 has a pair of spaced apart bosses 139 with aligned bores through which the associated guide rod 135 extends. Along the other lateral edge, each slide 137 has a set of offset fingers 141 and 143 which straddle the associated guide bar 133. The slides 137 are therefore mounted for reciprocal rectilinear movement along the guide bars 133 and guide rods 135.

Molded into the slides 137 on the face opposite that visible in FIG. 8 is a recess 145 which defines a camming surface 147. These camming surfaces 147 are engaged by drive pins 149 eccentrically mounted on the spur gears 115 and 117. Operation of the electric motor 121 drives the drive gear 119 which in turn rotates both spur gears 115 and 117 in the same direction thereby causing the slides 137 to reciprocate along the vertical paths defined by the guide bars 133 and guide rods 135. On the face of the slides visible in FIG. 8 are projections 151 having a transverse slot 153 which engages the handles 154 and 155 (shown fragmentarily in FIG. 8) of the circuit breaker 99 and 101, respectively. The drive pins 149 are eccentrically mounted at diametrically opposite locations on the spur gears 115 and 117 so that during operation of the electric motor 121, one slide member moves the handle of the associated circuit breaker from the off to on position while the other circuit breaker is moved from the on to off position. The shape of the camming surfaces 147 are such that the handle of the circuit breaker which was off is toggled to the on position before the handle of the other circuit breaker is toggled to the off position, thereby providing the closed transition. The maintenance bypass switch 97 can alternatively be operated manually by rotation of the handle 156 which rotates the drive gear 119.

Figure 9:
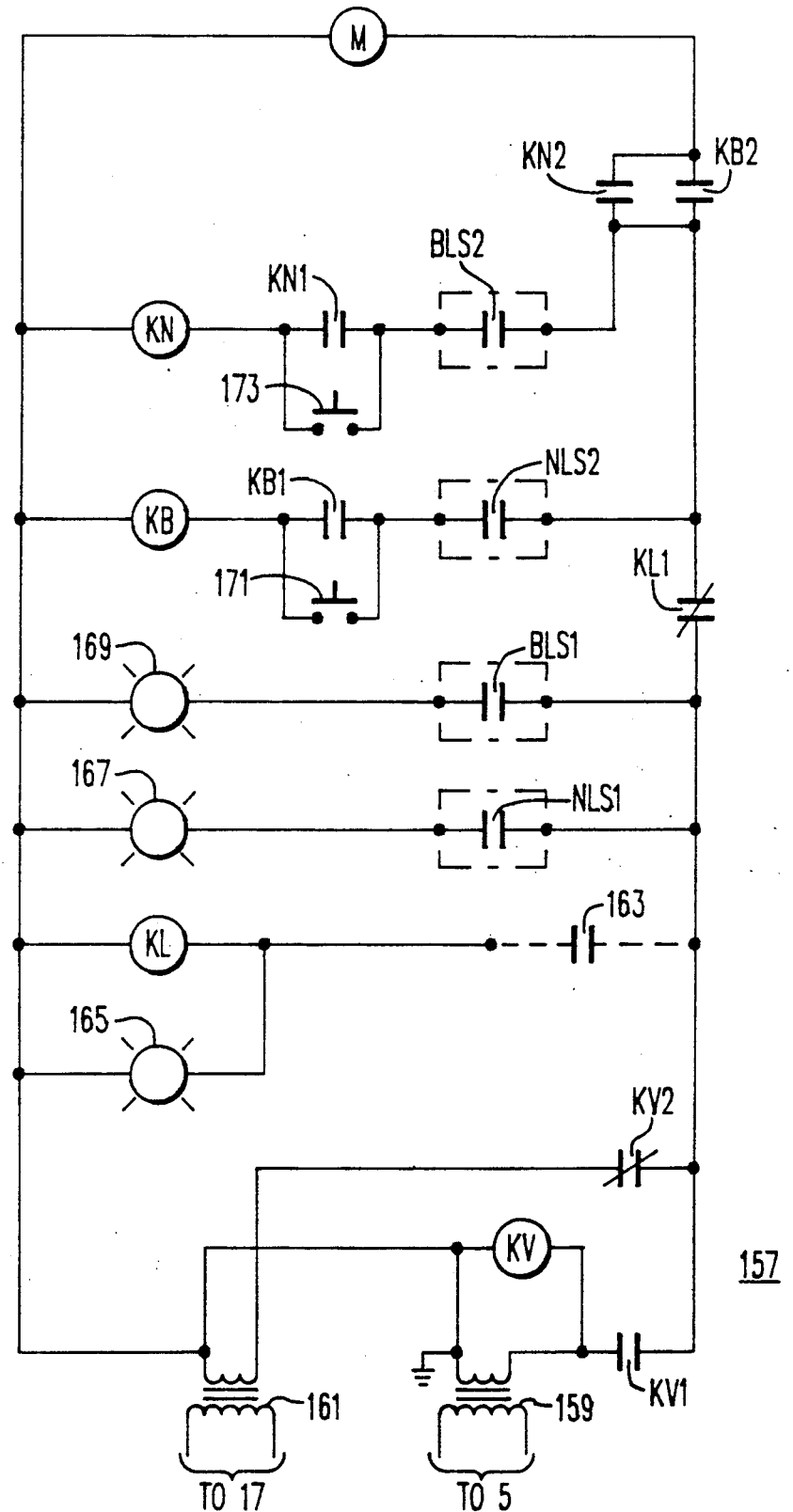
FIG. 9 is a schematic diagram of a control circuit for the maintenance bypass switches of FIGS. 4 through 8.

FIG. 9 is a schematic diagram for a suitable control circuit for the maintenance bypass switches 37 and 97. Power for the control circuit 157 is provided either from the commercial power system 5 through transformer 159 or from the alternate power system 17 through transformer 161. A voting relay KV having its coil connected across the secondary of the transformer 159 connects the control circuit 157 to the commercial power source if it is available by closing the normally open contacts KV1. If commercial power is not available, the relay KV is deenergized and the alternate power source supplies the power control circuit through the normally closed contacts KV2. The maintenance switches 37 and 97 should only be operated when the uninterruptible power supply 7 is supplying power from the commercial source. In order to prevent a closed transition when the alternate power source 17 of the uninterrupted power supply is supplying the load, the maintenance bypass switch is locked out. This lockout is effected by a contact 163 controlled by the static transfer switch 25 of the uninterruptible power supply. If this lockout contact 163 is closed, a relay KL is energized to open the contacts KL1 and, as will be seen, prevent operation of the maintenance bypass switch motor. The lockout condition is indicated by energization of a lockout lamp 165.

Each of the circuit breakers incorporated into the maintenance bypass switch, has a limit switch with two sets of normally open contacts. These contacts are open when the associated circuit breaker is open and are closed by closing of the circuit breaker. When the "normal" circuit breaker in the maintenance bypass switch is closed, the contacts NLS1 are closed to energize a normal lamp 167. Similarly, when the contacts BLS1 of the bypass switch are closed, a "bypass" lamp 169 is illuminated. If the "normal" circuit breaker of the maintenance bypass switch is closed, the contacts NLS2 of the associated limit switch will also be closed. If it is then desired to remove the uninterruptible power supply for maintenance and the uninterruptible power supply is supplying power to the load from the commercial power source so that the maintenance and bypass switch is not locked out, a bypass push-button 171 is momentarily depressed. This results in energization of a bypass relay KB which is sealed in by the normally open contacts KB1. Energization of the bypass relay also results in the closing of the normally open contacts KB2 to energize the electric motor M of the maintenance bypass switch. This results in closing of the bypass circuit breaker and opening of the normal circuit breaker with a closed transition as discussed above. When the "bypass" circuit breaker closes, the contacts BLS1 close to turn on the "bypass" lamp 169. When the "normal" circuit breaker toggles open, the contacts NLS2 of the associated limit switch open to drop out the bypass relay KB and thereby deenergize the transfer motor relay. This will result in turning off the normal lamp 167.

When it is desired to return the uninterruptible power source 7 to service, a "normal" push-button 173 is momentarily depressed to energize a "normal" relay KN through the contacts BLS2 of the limit switch on the closed "bypass" circuit breaker. The relay KN is sealed in by the normally open contacts KN1. The normally open contacts KN2 are also closed to energize the electric motor M resulting in closing of the normal circuit breaker and opening of the bypass circuit breaker of the maintenance bypass switch. Again, as the bypass circuit breaker opens, the contacts BLS2 open to deenergizes the motor relay and the contacts BLS1 open to turn off the "bypass" lamp 169. As the normal circuit breaker closes, the contacts NLS1 to illuminate the "normal" lamp 167.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A system for supplying electric power from a primary power source to a load, said system comprising:
   an uninterruptible power supply connected to said primary power source and including an alternate power source and a transfer switch selectively connecting the primary power source and said alternate power source to said load; and
   maintenance bypass switch means comprising a first switch connected in series between said uninterruptible power supply and said load, a second switch bypassing said uninterruptible power supply and said first switch and connecting said primary power source directly to said load, and operating means operating said first and second switches simultaneously in opposition to selectively open one of said switches and close the other with both of said switches closed momentarily to provide closed transition operation in which at least one of said first and second switches is always closed.

2. The system of claim 1 including an isolation switch connected in series between said uninterruptible power supply and said primary power source and shunted together with said uninterruptible power supply and said first switch by said second switch, said isolation switch being selectively open when said first switch is open to isolate said uninterruptible power supply for maintenance.

3. The system of claim 1 wherein said uninterruptible power supply includes lockout means which is actuated with said transfer switch positioned to connect said alternate power source to said load, and wherein said operating means of said maintenance bypass switch means includes means responsive to actuation of said lockout means to prevent operation of said first and second switches.

4. The system of claim 3 wherein said first and second switches have handles which toggle between off and on positions in which the switch is opened and closed, respectively, and wherein said operating means comprises a lever arm rotatable about a pivot located between the handles of said first and second switches, first and second coupling means on said lever arm coupling said lever arm to the handles of said first and second switches, respectively, and motive means reciprocably rotating said lever arm about said pivot to simultaneously, in opposition, selectively open one of said switches and close the other through said first and second coupling means, said first and second coupling means being configured to provide said closed transition operation.

5. The system of claim 3 wherein said first and second switches have handles which toggle between off and on positions in which the switch is opened and closed, respectively, and wherein said operating means includes first and second slides engaging the handles of said first and second switches, respectively, and mounted for rectilinear movement to toggle the respective switch between said off and on positions, said slides each having a camming surface, first and second gears each having an eccentric member engaging the camming surface of the first and second slides, respectively, and motive means having a drive gear meshing with and rotating both said first and second gears to reciprocally move said slides through said eccentric members and said camming surfaces to toggle the handles of said first and second switches in opposition with said closed transition operation.

* * * * *